Patented June 24, 1947

2,422,938

UNITED STATES PATENT OFFICE 2,422,938

METHOD OF EXTRACTING L-THYROXINE FROM THYROPROTEIN

Charles W. Turner and Ezra P. Reineke, Columbia, Mo., assignors to American Dairies Incorporated, Kansas City, Mo., a corporation of Maryland, and The Quaker Oats Company, Chicago, Ill., a corporation of New Jersey No Drawing. Application July 31, 1943, Serial No. 496,952

9 Claims. (Cl. 260—519)

Our invention relates to a method of hydrolytically decomposing thyroprotein compositions to release thyroxine from the protein molecule without destroying the thyroxine or rendering it biologically less active and without racemization.

Biologically active thyroprotein compositions can be synthesized from any protein containing the amino acid tyrosine. In our co-pending application Serial No. 441,116 filed on April 30, 1942, which matured into Patent No. 2,379,842 on July 3, 1945, we disclose a method of preparing a thyroprotein having substantially the same potency as natural thyroxine when compared on a basis of the iodine content. To synthesize a thyroprotein composition the tyrosine radical is chemically converted to a thyroxine radical, the latter remaining as a component part of the protein molecule. In this form, all of the thyroxine formed is levorotatory and has physiological activity. However, a thyroprotein cannot be injected intraveneously since the protein group frequently evidences toxic properties when administered in this manner. It must be taken orally and, when this is done, much of the thyroxine is lost in the digestive tract. Furthermore, the thyroxine does not have an immediate physiological effect when given orally.

Since the thyroxine, free from the protein group, can be injected intravenously without ill effects, it is desirable to obtain it in this manner. Aside from the clinical value of obtaining the thyroxine free from the protein, it is often necessary or desirable to obtain it in this form for laboratory or other purposes.

In the past, thyroprotein has been broken down to release the thyroxine by the action of proteolytic enzymes and also by hydrolysis with inorganic alkalies. Poor yields result from proteolytic action. If an inorganic alkali such as barium hydroxide is used, the thyroxine is not destroyed but is obtained as a racemic or dextrolevorotatory mixture. Since only the levorotatory isomer has biological activity, one-half of the available thyroxine is lost by this process. Although certain amino acids can be obtained in their natural levorotatory state by hydrolysis of proteins with mineral acids, thyroxine is destroyed when a thyroprotein is hydrolyzed with an acid alone. All attempts to recover thyroxine from thyroproteins by direct hydrolysis with acids have failed because, under the conditions used, the thyroxine is destroyed during the hydrolysis.

An important object of our invention is to provide a method of decomposing thyroprotein so that all of the available thyroxine is obtained in the biologically active levo form.

Another object of our invention is to provide a method of decomposing thyroprotein without destroying or reducing the potency of the thyroxine.

Other objects and advantages of our invention will be apparent during the course of the following description.

We have discovered that, if the thyroprotein is hydrolyzed in an aqueous solution of a mineral acid and N-butyl alcohol, racemization does not occur and the available thyroxine can be obtained in the potent levo form.

To practice the invention, we use as a starting material a synthetic thyroprotein formed by the iodination of a protein such as casein, egg albumin, or soy bean protein. We prefer to use a thyroprotein prepared in the manner described in our copending application Serial No. 441,116 above referred to, since by this method, substantially all of the available tyrosine in the protein is converted to thyroxine having essentially the same potency as natural thyroxine.

To release the thyroxine from the protein molecule it is necessary to hydrolyze the thyroprotein. This is done by placing the thyroprotein in an aqueous solution of a mineral acid to which has been added a substantially equal volume of N-butyl alcohol. An aqueous solution containing from 15 to 35 percent acid is satisfactory although this range is not critical and varies considerably with the particular acid used. Sulfuric acid has been found to be most satisfactory; however, hydrochloric acid can be used with less satisfactory results. The above mixture is boiled until it becomes negative to the biuret reaction indicating that hydrolysis is complete. The biuret test is commonly used to determine when proteins have become completely hydrolyzed. A positive reaction is obtained when long chain amino acids are present and a negative reaction occurs when the hydrolysis is complete so that only free acids or short chains of acids are present. In the concentrations of acid above recommended, the acid is slightly miscible in the alcohol under normal temperature and pressure conditions. However, when the mixture is boiled, the acid becomes completely miscible in the alcohol and hydrolysis occurs. Hydrolysis is usually complete after boiling from 10 to 20 hours, the time required being a function of the type of acid and the concentrations employed. During this step the thyroxine radical is broken away from the protein group and becomes a separate thyroxine molecule.

We do not know why the alcohol prevents the acid from destroying the thyroxine during hydrolysis. We do know, however, that although hydrolysis with a mineral acid alone destroys the thyroxine, the thyroxine is not destroyed if a substantially equal volume of N-butyl alcohol is mixed with the acid solution. We base our claim for invention on the facts observed and not on any theory to support it.

When hydrolysis is complete the mixture is allowed to cool to room temperature. As the mixture cools, the acid and alcohol become less miscible and gradually separate into two distinct layers. Water is added to effect a complete separation. The more dilute acid is completely immiscible with the alcohol. All of the thyroxine and certain other of the hydrolytic products are selectively soluble in the alcohol and can be easily separated from the acid by removing the alcohol layer in a separatory funnel. The alcohol is dark in color due to the presence of decomposition products formed during hydrolysis.

The thyroxine can be extracted from the alcohol and separated from the other hydrolytic decomposition products in any manner well known to the art. The following procedure has been found to be satisfactory.

Certain of the impurities in the alcohol layer are removed by extracting the alcohol with an aqueous alkaline solution. A solution containing approximately 16 per cent of sodium hydroxide and 5 per cent of sodium carbonate is satisfactory. The alkaline solution is added to the alcohol and the two liquids thoroughly mixed in a separatory funnel. Since they are immiscible they soon separate and the alcohol is easily separated. After this procedure has been repeated several times the alcohol becomes much lighter in color, but still contains considerable decomposition products besides the thyroxine.

The next step in purifying the thyroxine is to distill the alcohol under vacuum. Before the alcohol is heated the trace of alkali remaining in it from the preceding extraction step is neutralized by adding a small amount of dilute hydrochloric acid, since racemization of thyroxine occurs in hot solutions containing strong alkali. After distillation of the alcohol the solid residue is dissolved in a weak aqueous alkaline solution such as dilute ammonium hydroxide. Most of the impurities in the alkaline solution can be removed by the addition of a small excess of a solution of barium hydroxide. If the barium hydroxide is at a concentration of 5 per cent or less it will form barium salts with most of the amino acids and dark colored impurities in the alkaline solution but will not form barium salts of thyroxine. The barium salts precipitate and are removed by filtration. The filtrate is a concentrated solution containing a high percentage of thyroxine and some impurities.

The thyroxine and some acid-insoluble impurities are precipitated from the filtrate by the addition of sufficient acid, such as acetic acid, to bring the solution to a pH of between 4 and 5. A crude mono-sodium salt of thyroxine is obtained by dissolving in a hot aqueous solution of sodium carbonate, the insoluble impurities are filtered from the hot solution and the sodium carbonate solution is chilled. The mono-sodium salt of thyroxine precipitates and is removed by centrifuging or filtration. This procedure is repeated several times to assure complete removal of all thyroxine.

The sodium salt of thyroxine is converted to pure crystalline thyroxine by dissolving the salt in 80 per cent ethyl alcohol containing a small amount of an alkali such as sodium hydroxide. When this solution is heated to its boiling point and a few drops of glacial acetic acid are added the sodium salt is broken down and pure thyroxine crystallizes out.

Strong alkaline solutions usually cause racemization of thyroxine. Consequently, very weak or dilute alkaline solutions are used throughout the above procedure. When weak alkaline solutions are used in the manner described, no racemization occurs and all of the levo thyroxine radicals in the thyroprotein are converted to levo thyroxine molecules. There is no loss of the biologically active levo thyroxine formed in the protein.

Methods used previously for the recovery of levo-rotary thyroxine in a pure state have involved either its resolution from a dextro-levo mixture of thyroxine, or its recovery from natural thyroid substance by hydrolytic or proteolytic decomposition. The instant process affords for the first time a method of preparing levorotatory thyroxine from thyroactive proteins by direct hydrolysis with an acid.

The following examples more specifically define the invention:

Example 1.—600 grams of a thyroactive iodinated casein were added to a mixture comprising 3 liters of N-butyl alcohol and 3 liters of a 30 per cent aqueous solution of sulfuric acid. This mixture was heated under reflux on a boiling water bath for 13 hours at which time it became negative to the biuret reaction, indicating that hydrolysis was complete. After the mixture had cooled it was placed in a separatory funnel and 6 liters of distilled water added, this amount sufficiently diluting the acid to assure complete separation of the acid and alcohol. Some of the impurities in the alcohol solution were removed by extracting the alcohol three times with separate portions of an aqueous solution containing 16 per cent sodium hydroxide and 5 per cent sodium carbonate. After adjusting the pH of the extracted alcohol solution to 4.5 by adding dilute hydrochloric acid the alcohol was distilled off under vacuum by heating on a water bath. The solid residue thus obtained was dissolved in distilled water containing a small amount of ammonium hydroxide and heated to 60° C. Warm barium hydroxide solution was added until a flocculent precipitate of barium salts formed. This precipitate was removed by filtration and treated to extract any thyroxine pulled down with the barium salts. After the barium salts were filtered off, the filtrate was acidified with dilute acetic acid to a pH of 4.5 whereupon a light colored precipitate of thyroxine and some impurities settled out. The barium salts were then treated to remove any thyroxine therein by adding dilute hydrochloric acid to the salts until a reaction slightly acid to Congo red was obtained. The acid insoluble precipitate including thyroxine was recovered by filtration, dissolved in one liter of water containing a small amount of ammonium hydroxide and treated with barium hydroxide in the manner described above. After the barium salts were removed the filtrate was again adjusted to a pH of 4.5 and the acid insoluble precipitate added to the light colored precipitate above referred to.

The combined precipitates were then treated to remove any barium carried through by dissolving it in 800 milliliters of distilled water containing a small amount of ammonium hydroxide. This solution was warmed to 60° C. and a few milliliters of saturated ammonium sulfate added.

The barium sulfate that formed was removed by centrifuging and the clear amber colored supernatant solution removed by decantation to recover the thyroxine and other decomposition products. The decanted liquid was acidified with dilute sulfuric acid to a pH of 5.0. The thyroxine and other acid insoluble materials precipitated and were recovered by filtering the solution while still hot. The precipitate was then washed with acetic acid. The 7.2 grams of acid insoluble precipitate obtained contained 41.5 per cent of iodine and exerted a marked metabolic effect on guinea pigs.

To obtain levo thyroxine in its pure crystalline form, the precipitate was dissolved in 300 milliliters of hot N/10 sodium carbonate solution, this being the minimum amount which would dissolve the precipitate. The thyroxine will remain dissolved in this solution as long as it is heated, however, some impurities will not dissolve in the solution and these are removed by centrifuging. After removal of the impurities the solution was chilled to 0° C. at which temperature a heavy micro-crystalline precipitate of the mono-sodium salt of thyroxine settled out. After recovery of the precipitate the mother liquor was concentrated by boiling and again chilled to 0° C. to obtain a small amount of thyroxine which did not precipitate out of the more dilute solution. The sodium salt was purified by re-crystallizing it three times from fresh sodium carbonate solutions and then dissolving it in a small amount of alkaline 80 per cent ethyl alcohol. After a trace of undissolved residue was removed from the alcohol solution by centrifuging, the solution was brought to the boiling point and a few drops of glacial acetic acid were added. Immediately 0.6 gram of pure thyroxine crystallized out in the form of miscropic rosettes and bundles of fine needles. The crystals melted with decomposition at 236° C. to 238° C. and contained 64-65 per cent of iodine. All of the thyroxine was levorotatory, thus being recovered in the same state in which thyroxine occurs naturally in the thyroid gland. When tested by its elevation of the metabolism of guinea pigs, the thyroxine above obtained showed twice the activity of a crystalline dextro-levo-mixture of thyroxine.

*Example 2.*—600 grams of thyroactive iodinated soy bean protein were added to a mixture of 3 liters of 20 per cent hydrochloric acid and 3 liters of N-butyl alcohol. This mixture was then heated thoroughly until completely hydrolyzed and the thyroxine purified in the manner described in the first example.

Slightly less amounts of thyroxine are obtained when hydrochloric acid is used than when sulfuric acid is used, but all of the thyroxine recovered is in the levo form.

Having thus described our invention, we claim:

1. A hydrolytic decomposition method of obtaining levorotatory thyroxine from thyroprotein compositions without racemization comprising the steps of hydrolyzing a thyroprotein in a mixture of N-butyl alcohol and an aqueous solution of a mineral acid and isolating levo thyroxine therefrom.

2. A hydrolytic decomposition method of obtaining levorotatory thyroxine from thyroprotein compositions without racemization comprising the steps of hydrolyzing a thyroprotein in a mixture of N-butyl alcohol and an aqueous solution of sulfuric acid and isolating levo thyroxine therefrom.

3. A hydrolytic decomposition method of obtaining levorotatory thyroxine from thyroprotein compositions without racemization comprising the steps of hydrolyzing a thyroprotein in a mixture of N-butyl alcohol and an aqueous solution of hydrochloric acid and isolating levo thyroxine therefrom.

4. A hydrolytic decomposition method of obtaining levorotatory thyroxine from thyroprotein compositions without racemization comprising the steps of hydrolyzing a thyroprotein in substantially equal volumes of N-butyl alcohol and an aqueous solution of a mineral acid and isolating levo thyroxine therefrom.

5. A hydrolytic decomposition method of obtaining levorotatory thyroxine from thyroprotein compositions without racemization comprising the step of hydrolyzing the thyroprotein in a mixture of an aqueous solution of a mineral acid selected from the group consisting of sulfuric acid and hydrochloric acid and N-butyl alcohol, the acid being present in an amount sufficient to liberate the thyroxine radicals from the protein groups by hydrolysis but insufficient to oxidize or inactivate said thyroxine, and the alcohol being present in an amount sufficient to keep substantially all of the thyroxine in solution.

6. A hydrolytic decomposition method of obtaining levorotatory thyroxine from thyroprotein compositions without racemization comprising the steps of hydrolyzing a thyroprotein in substantially equal volumes of N-butyl alcohol and an aqueous solution of a mineral acid selected from the group consisting of sulfuric acid and hydrochloric acid, and isolating levo thyroxine therefrom.

7. A hydrolytic decomposition method of obtaining levorotatory thyroxine from thyroprotein compositions without racemization, comprising the steps of hydrolyzing a thyroprotein in a mixture of N-butyl alcohol and sulfuric acid in a concentration of the order of 30% by weight, and isolating levo thyroxine therefrom.

8. A hydrolytic decomposition method of obtaining levorotatory thyroxine from thyroprotein compositions without racemization, comprising the steps of hydrolyzing a thyroprotein in a mixture of N-butyl alcohol and hydrochloric acid in a concentration of the order of 20% by weight, and isolating levo thyroxine therefrom.

9. A hydrolytic decomposition method of obtaining levorotatory thyroxine from thyroprotein compositions without racemization, comprising the steps of hydrolyzing a thyroprotein by placing it in a mixture of substantially equal volumes of N-butyl alcohol and an aqueous solution of a mineral acid selected from the group consisting of sulfuric acid and hydrochloric acid, and boiling the mixture until it becomes negative to the biuret reaction, and then isolating levo thyroxine therefrom.

CHARLES W. TURNER.
EZRA P. REINEKE.

REFERENCES CITED

The following references are of record in the file of this patent:

UNITED STATES PATENTS

| Number | Name | Date |
| --- | --- | --- |
| 626,648 | Bauman | June 6, 1899 |
| 1,392,767 | Kendall | Oct. 4, 1921 |
| 2,060,021 | Bockmuhl | Nov. 10, 1936 |
| 2,080,132 | Holaday et al. | May 11, 1937 |
| 2,130,985 | Lautenschlager et al., | Sept. 20, 1938 |